United States Patent
Kogawa et al.

(10) Patent No.: US 8,655,295 B2
(45) Date of Patent: Feb. 18, 2014

(54) RECEIVING APPARATUS

(75) Inventors: Tsuyoshi Kogawa, Kawasaki (JP); Koji Ogura, Tachikawa (JP); Shoji Otaka, Yokohama (JP); Hiroaki Ishihara, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 132 days.

(21) Appl. No.: 13/370,535

(22) Filed: Feb. 10, 2012

(65) Prior Publication Data
US 2012/0208482 A1 Aug. 16, 2012

(30) Foreign Application Priority Data
Feb. 16, 2011 (JP) ................................ 2011-030845

(51) Int. Cl.
*H04B 1/06* (2006.01)
(52) U.S. Cl.
USPC ........ 455/234.1; 455/130; 455/136; 455/138; 455/219; 375/316; 375/345
(58) Field of Classification Search
USPC ........... 455/130, 136, 138, 219, 232.1, 234.1, 455/239.1, 240.1, 245.1, 247.1, 2, 50.1, 455/251.1; 375/316, 345
See application file for complete search history.

(56) References Cited

U.S. PATENT DOCUMENTS

| | | | |
|---|---|---|---|
| 6,816,013 B2 * | 11/2004 | Kao | 330/279 |
| 8,116,485 B2 * | 2/2012 | Escott et al. | 381/107 |
| 2008/0146181 A1 * | 6/2008 | Mason et al. | 455/234.1 |

FOREIGN PATENT DOCUMENTS

| | | |
|---|---|---|
| JP | 2005-101845 A | 4/2005 |
| JP | 2007-116621 A | 5/2007 |
| JP | 2010-81015 A | 4/2010 |

OTHER PUBLICATIONS

Japanese Office Action dated Oct. 2, 2012 (and English translation thereof) in counterpart Japanese Application No. 2011-030845.

\* cited by examiner

*Primary Examiner* — Tuan Pham
(74) *Attorney, Agent, or Firm* — Holtz, Holtz, Goodman & Chick PC (57) ABSTRACT

According to one embodiment, a receiving apparatus includes a variable gain amplifier, comparator, and signal processor. The comparator compares a signal level of the second signal with a first threshold to generate a third signal, a signal level of the third signal being set to a high signal if the signal level of the second signal is greater than the first threshold. The signal processor determines presence of a signal if a rate of high signals in third signals for a period is greater than a second threshold. The second threshold is set to a first value when the control of the gain is performed and set to a second value when the demodulation processing is performed. The first value is greater than the second value.

4 Claims, 5 Drawing Sheets

RECEIVING APPARATUS

CROSS-REFERENCE TO RELATED APPLICATIONS

This application is based upon and claims the benefit of priority from prior Japanese Patent Application No. 2011-030845, filed Feb. 16, 2011, the entire contents of which are incorporated herein by reference.

FIELD

Embodiments described herein relate generally to a receiving apparatus.

BACKGROUND

In wireless communication, space propagation causes loss of an electromagnetic wave transmitted from an antenna of a transmitting apparatus before the wave is received by an antenna of a receiving apparatus. Such space-propagation loss depends not only on a distance from the antenna of the transmitting apparatus to the antenna of the receiving apparatus but also directivity of the antennas, materials of utensils existing in an actual communication environment, a positional relationship between the utensils, and the like. The loss accordingly varies much. Therefore, to achieve high quality communication, the receiving apparatus is required to control a gain of an amplifier depending on a received power level.

There are communication methods in which data is expressed as a signal level of a transmission signal, such as amplitude shift keying (ASK) and on-off keying (OOK). If such a communication method is used, the receiving apparatus has only to include at least one comparator. Therefore, the receiving apparatus can have a simpler configuration compared with a receiving apparatus used in a wireless LAN system according to IEEE802.11. However, there is a difficulty in determining whether a signal output from the comparator derives from a received signal or noise if only one comparator is provided. It may be difficult to control a gain so as to obtain a signal power adequate for demodulation processing.

A receiving apparatus using a communication method in which data is expressed as a signal level of a transmission signal is therefore demanded to be capable of controlling a gain of an amplifier so as to achieve a signal-to-noise ratio (SNR) required for demodulation processing.

DETAILED DESCRIPTION

In general, according to one embodiment, a receiving apparatus includes a variable gain amplifier, a comparator, and a signal processor. The variable gain amplifier is configured to amplify a first received signal by a variable gain to generate a second received signal. The comparator is configured to compare a signal level of the second received signal with a first threshold to generate a third received signal, a signal level of the third received signal being set to a high signal if the signal level of the second received signal is greater than the first threshold, the signal level of the third received signal being set to a low signal if the signal level of the second received signal is not greater than the first threshold. The signal processor is configured to determine presence of a signal if a rate of high signals in third signals third received signals for a period is greater than a second threshold, and perform a control of the gain and a demodulation processing based on a determination result. The signal processor is configured to set a first value as the second threshold for a first period in which the control of the gain is performed and to set a second value as the second threshold for a second period in which the demodulation processing is performed.

The receiving apparatus according to the embodiment can control the gain of the variable gain amplifier so as to obtain a signal-to-noise ratio (SNR) required for demodulation processing.

Hereinafter, receiving apparatuses according to various embodiments will be described with reference to the accompanying drawings. In the embodiments described below, like reference numbers denote like elements, and duplicate explanations will be avoided.

First Embodiment

Figure 1:
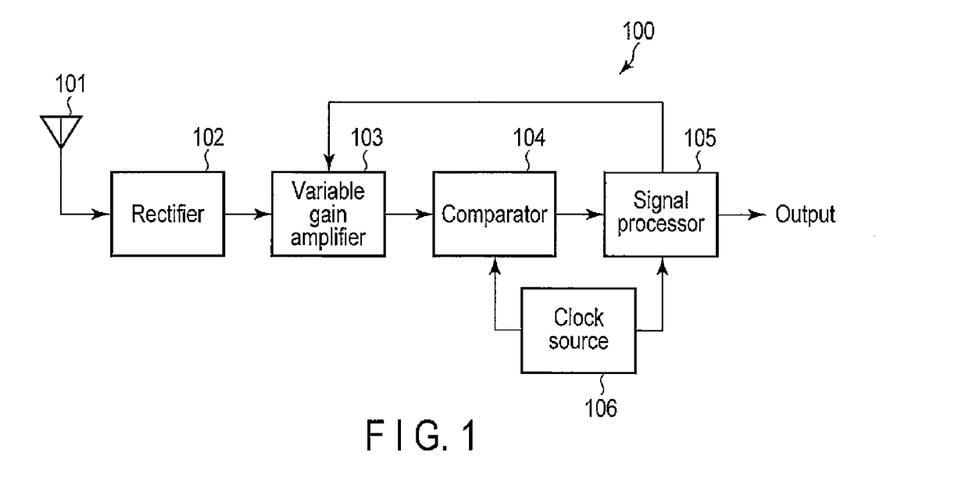
FIG. 1 is a block diagram schematically showing a receiving apparatus according to a first embodiment.

FIG. 1 schematically shows a receiving apparatus 100 according to a first embodiment. The receiving apparatus 100 receives a signal transmitted from a transmitting apparatus (not shown) according to the present embodiment, and demodulates the received signal. The transmitting apparatus modulates and transmits data according to a predetermined modulation scheme. As the modulation scheme, it is possible to employ a communication method in which data is expressed as a signal level of a transmission signal, such as amplitude shift keying (ASK), on-off keying (OOK), or pulse position modulation (PPM). In the present embodiment, an example of using the OOK will be described. In the OOK, digital data is expressed by presence or absence of a signal. The transmitting apparatus transmits data by changing presence or absence of transmission of a transmission signal (or a carrier wave). In the present embodiment, transmission of a transmission signal corresponds to bit "1", and no transmission of a transmission signal corresponds to bit "0". The receiving apparatus 100 demodulates a received signal by detecting time change of presence or absence of an electric power of the received signal.

As shown in FIG. 1, the receiving apparatus 100 includes an antenna 101, a rectifier 102, a variable gain amplifier (VGA) 103, a comparator 104, a signal processor 105, and a clock source 106. FIG. 1 mainly shows elements relating to reception and demodulation of a signal, and does not show all elements of the receiving apparatus 100.

The antenna 101 receives a signal of a radio frequency which is transmitted from the transmitting apparatus. The rectifier 102 rectifies the signal (received signal) received by the antenna 101.

The variable gain amplifier 103 amplifies the received signal rectified by the rectifier 102. Specifically, the variable gain amplifier 103 sets a gain in accordance with a gain control signal supplied from the signal processor 105, and amplifies the received signal rectified by the rectifier 102 in accordance with the set gain.

The comparator 104 generates a pulse signal whose signal level (High or Low) changes in accordance with the received signal amplified by the variable gain amplifier 103. Specifically, the comparator 104 compares a signal level (or a voltage level) of the amplified received signal with a predetermined first threshold level (or threshold voltage). Then, the comparator 104 outputs a pulse signal whose signal level is High (or a high signal) if the voltage level of the amplified received signal exceeds the first threshold level as well as a pulse signal whose signal level is Low (or a low signal) if the voltage level of the amplified received signal is not greater than the first threshold level. The Low expresses a signal level lower than the High. The first threshold level is also referred to as a comparator threshold level.

The comparator 104 is connected to a clock source 106 which generates a clock signal at a predetermined frequency. The comparator 104 operates in accordance with a clock signal supplied from the clock source 106. The comparator 104 compares the voltage level of the received signal with the first threshold level every one clock (or clock cycle). Therefore, the signal level of the pulse signal output from the comparator 104 changes to either High or Low every one clock.

The signal processor 105 generates a gain control signal for controlling the gain of the variable gain amplifier 103, based on the pulse signal from the comparator 104. Further, the signal processor 105 performs demodulation processing on the pulse signal. The signal processor 105 is connected also to the clock source 106. The signal processor 105 also operates in accordance with the clock signal supplied from the clock source 106. The signal processor 105 samples the pulse signal from the comparator 104 every one clock, and detects whether the signal level of the sampled pulse signal (hereinafter, referred to as a sample) is High or Low. The signal processor 105 determines presence or absence of a signal based on the detection result of the signal level, and performs gain control and demodulation processing based on the determination result. The gain control and demodulation processing will be described later.

The gain control signal generated by the signal processor 105 is sent to the variable gain amplifier 103, and the gain of the variable gain amplifier 103 is set to a value specified by the gain control signal. Further, data obtained as a result of the demodulation processing is sent to a higher-level layer (not shown) connected to the receiving apparatus 100.

Figure 2:
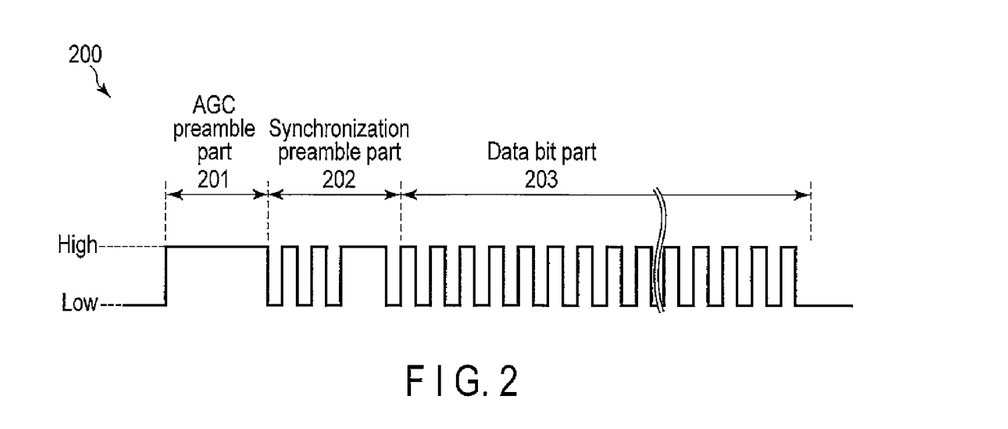
FIG. 2 is a schematic diagram showing a frame received by the receiving apparatus in FIG. 1.

FIG. 2 schematically shows a frame 200 according to the present embodiment. As shown in FIG. 2, the frame 200 includes an automatic-gain-control (AGC) preamble part 201, a synchronization preamble part 202, and a data bit part 203. The synchronization preamble part 202 follows after the AGC preamble part 201. The data bit part 203 follows after the synchronization preamble part 202.

The AGC preamble part 201 has a fixed pattern in which the bit "1 (High)" continues, for example, like a bit sequence "1111", and is used to control the gain of the variable gain amplifier 103. The synchronization preamble part 202 has a specific pattern including bit "0 (Low)" and bit "1 (High)", and is used for timing synchronization. The pattern of the synchronization preamble part 202 is a known pattern which is arranged in advance between the transmitting apparatus and the receiving apparatus 100. The data bit part 203 includes data which the transmitting apparatus desires to transfer to the receiving apparatus 100.

The transmitting apparatus of the present embodiment modulates and transmits the frame 200 in accordance with the OOK. As described above, in the present embodiment, transmission of the transmission signal corresponds to the bit "1", and no transmission of the transmission signal corresponds to the bit "0". Accordingly, the transmitting apparatus continuously transmits the transmission signal (or a carrier wave) during transmission of the AGC preamble part 201. The receiving apparatus 100 adjusts the gain of the variable gain amplifier 103 by utilizing a feature that, for a period of receiving the AGC preamble part 201, an output of the comparator 104 is always at High if the gain of the variable gain amplifier 103 is set to an appropriate value.

Next, the signal processor 105 will be described in more detail, referring to FIGS. 1 and 2.

The signal processor 105 performs processing, such as edge detection, automatic gain control (AGC), timing synchronization, chip determination, and decoding, in order to demodulate a received signal.

The edge detection is the processing to detect an edge (or a head) of the frame 200 transmitted from the transmitting apparatus. As an example, an edge of a frame 200 is determined when the pulse signal from the comparator 104 is detected to switch from Low to High after continuation of Low for a predetermined period. As another example, an edge of a frame 200 is determined when the signal processor 105 detects High appearing sequentially throughout a predetermined number of samples (a predetermined number of clocks). A range of the gain of the variable gain amplifier 103 is predetermined, and is set to a maximum value when the edge detection is performed.

When the signal processor 105 detects an edge of a frame 200, the signal processor 105 then starts the AGC processing. For a period of receiving the AGC preamble part 201 of the frame 200 (hereinafter referred to as an AGC period), the signal processor 105 controls the gain of the variable gain amplifier 103 so as to obtain a proper gain. Here, the proper gain implies a gain required for correctly identifying whether each of chips forming the synchronization preamble part 202 and data bit part 203 is at High or Low. For example, if the gain is too low for a received power level, the voltage level of the amplified received signal may be smaller than the comparator threshold level and be sometimes incorrectly determined to be Low, even though the receiving apparatus 100 receives a signal of High from the transmitting apparatus. If the gain is too high for a received power level, the voltage level of the amplified received signal may exceed a comparator threshold level due to a noise and a signal other than a desired signal, and be sometimes incorrectly determined to be High, even though the receiving apparatus 100 receives a signal of Low from the transmitting apparatus.

As described above, the AGC preamble part 201 has a fixed pattern in which the bit "1" continues. The signal processor 105 determines a value (setting value) of the gain set in the variable gain amplifier 103 by using the AGC preamble part 201. The setting value is used when the synchronization preamble part 202 and data bit part 203 are received and demodulated. In an example, for a period of receiving the AGC preamble part 201, the signal processor 105 determines the setting value for the gain by repeatedly performing a process of reducing the gain when presence of a signal is determined and increasing the gain when absence of a signal is determined.

In the present embodiment, for an AGC period, the signal processor 105 determines presence of a signal if a rate of high signals in the samples obtained from the pulse signal output from the comparator 104 is not smaller than a second threshold level. Otherwise, if the rate is smaller than the second threshold level, the signal processor 105 determines absence of a signal. As an example, the second threshold level is set to 0.8. In this example, the signal processor 105 selects five samples from eight sequential samples. If four or more samples among the selected five samples are high signals, the signal processor 105 determines presence of a signal. If less than four samples are high signals, the signal processor 105 determines absence of a signal.

When the synchronization preamble part 202 and data bit part 203 are received and demodulated, the gain of the variable gain amplifier 103 is set to the setting value determined by the signal processor 105. When the edge detection is thereafter performed again, the gain of the variable gain amplifier 103 is set to the maximum value.

After the signal processor 105 determines the setting value of the gain, the timing synchronization is performed by using the synchronization preamble part 202. Since the synchronization preamble part 202 has a known pattern which is arranged in advance between the transmitting apparatus and receiving apparatus 100, the signal processor 105 can synchronize timings by using the synchronization preamble part 202. If the received synchronization preamble part 202 does not match a specific pattern, the signal processor 105 determines a false detection and returns to the edge detection.

Further, the signal processor 105 performs a chip determination to determine whether each of the chips forming the data bit part 203 is at High or Low, based on the pulse signal from the comparator 104. In the present embodiment, one chip length is set to a value obtained by multiplying one clock by a predetermined number. That is, a sampling rate is set to a predetermined number of times the chip rate. If the sampling rate is set to eight times the chip rate, eight samples are obtained from each chip. The signal processor 105 determines whether each chip is at High (which corresponds to presence of a signal) or Low (which corresponds to absence of a signal), based on a plurality of samples obtained for each chip. As an example, whether each chip is at High or Low is determined by performing a majority vote based on a plurality of samples obtained for each chip, i.e., with the second threshold level set to 0.5. In this example, the signal processor 105 selects five samples from eight samples obtained for each chip. If three or more samples among the selected five samples are high signals, a corresponding sampled chip is determined to be at High. Otherwise, if less than three samples are high signals, a corresponding sampled chip is determined to be at Low.

In the present embodiment, the second threshold level is set to a first value in the AGC processing and set to a second value in the demodulation processing on the synchronization preamble part and data bit part, where the first value is greater than the second value. In the foregoing example, the second threshold level is 0.8 for a period in which the AGC processing is performed and is 0.5 for a period in which the demodulation processing on the synchronization preamble part and data bit part is performed. If the second threshold level to determine presence or absence of a signal is set to a greater value, presence of a signal is hardly determined. By performing the ACG processing on a condition that presence of a signal is difficult to determine, the setting value of the gain is avoided from being determined to be a lower value than a value to obtain a required SNR. Thus, the gain is prevented from being set to be lower under influence of noise when the AGC processing is performed on a stricter condition of determining presence of a signal. As a result, a desired SNR can be obtained, and reception performance can be improved.

Next, the signal processor 105 obtains binary data before coding, based on a result of the foregoing chip determination. The present embodiment employs the communication scheme OOK. In this case, one chip corresponds to one bit. "High (H)" and "Low (L)" are predetermined so as to correspond respectively to "1" and "0". If a result of the chip determination is "HHLH", the signal processor 105 obtains "1101" as binary data. As another example, if the communication scheme is binary PPM, two chips correspond to one bit, and "HL" and "LH" are respectively predetermined to correspond to "0" and "1", for example. In this case, if a result of the chip determination is "LHLHHLLH", the signal processor 105 obtains "1101" as binary data.

Further, if the data bit part 203 is coded by using, for example, parity bit codes, the signal processor 105 decodes the data bit part 203 in accordance with a predetermined coding rule. The signal processor 105 outputs data obtained by decoding the data bit part 203, to the higher-level layer.

Determination of presence of a signal is not limited to the example in which the pulse signal from the comparator 104 is sampled at a predetermined sampling rate and presence of a signal is determined if a rate of high signals in samples exceeds the second threshold level. The signal processor 105 may determine presence of a signal if a rate of high signals in pulse signals for a period exceeds the second threshold level.

Further, the signal processor 105 is not limited to the example of directly outputting data obtained by demodulation as described above. The data obtained by demodulation may be output after being converted into a control signal for controlling operation of the higher-level layer. When data obtained by demodulation is output after being converted into a control signal, for example, the signal processor 105 stores one or more data patterns, together with control signals respectively associated with the data patterns, and then outputs a control signal associated with a data pattern corresponding to data obtained by demodulation. As an example, the control signal is a signal for controlling a power supply in a higher-level layer.

As described above, the receiving apparatus 100 according to the present embodiment sets the second threshold level, which is used for determining presence or absence of a signal, to a greater value for a period in which the AGC processing is performed than that for a period in which the demodulation processing is performed. Therefore, the gain of the variable gain amplifier can be prevented from being set to be low under influence of noise. As a result, a desired SNR can be obtained, and reception performance can be improved.

Second Embodiment

Figure 3:
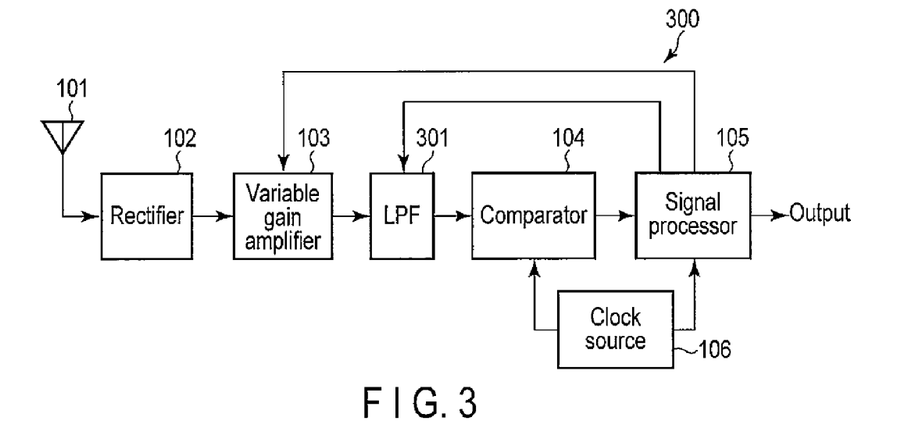
FIG. 3 is a block diagram schematically showing a receiving apparatus according to a second embodiment.

FIG. 3 schematically shows a receiving apparatus 300 according to a second embodiment. The receiving apparatus 300 includes a low pass filter (LPF) in addition to the configuration of the receiving apparatus 100 shown in FIG. 1. The LPF 301 is provided between the variable gain amplifier 103 and the comparator 104. A bandwidth of the LPF 301 is set in accordance with a bandwidth control signal supplied from the signal processor 105. In the present embodiment, the bandwidth of the LPF 301 is set to be narrower for an AGC period than for the period other than the AGC period. If the bandwidth of the LPF 301 is set to be narrower, a noise level of a received signal which has passed through the LPF 301 decreases more to become a signal whose high-frequency component is more attenuated. This signal is unlikely to be determined to be at High (which corresponds to presence of a signal) by the comparator 104.

As described above, in the receiving apparatus 300 according to the present embodiment, the bandwidth of the LPF 301 is set to be narrower for the AGC period than for the period other than the AGC period. Accordingly, the gain of the variable gain amplifier is prevented from being set to be low under influence of noise. As a result, a desired SNR can be obtained, and reception performance can be improved.

Third Embodiment

Next, a receiving apparatus according to a third embodiment will be described with reference to FIGS. 4 and 5.

In the first embodiment, a comparator threshold level is a fixed value. In contrast, in the third embodiment, the comparator threshold level is made variable.

Figure 4:
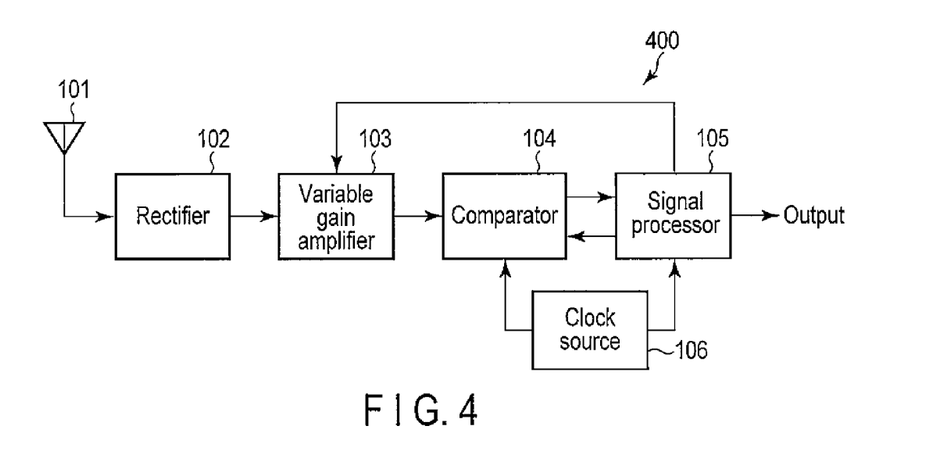
FIG. 4 is a block diagram schematically showing a receiving apparatus according to a third embodiment.

FIG. 4 schematically shows a receiving apparatus 400 according to the third embodiment. The receiving apparatus 400 in FIG. 4 differs from the receiving apparatus 100 in FIG. 1 in that an interface is added between the comparator 104 and the signal processor 105. Specifically, the signal processor 105 of the present embodiment generates a threshold level control signal to control the comparator threshold level, and sends the signal to the comparator 104. The comparator 104 compares a voltage level of a received signal amplified by a variable gain amplifier 103 with a comparator threshold level which is set in accordance with the threshold level control signal. The comparator 104 outputs a pulse signal whose signal level is High (or a high signal) if the voltage level exceeds the comparator threshold level. Otherwise, the comparator 104 outputs a pulse signal whose signal level is Low (or a low signal) if the voltage level is not greater than the comparator threshold level. In the present embodiment, the comparator threshold level is set to a value $V_{Th\_AGC}$ for an AGC period. The comparator threshold level is set to a value $V_{Th\_mod}$ for other periods than the AGC period. The value $V_{Th\_mod}$ is smaller than the value $V_{Th\_AGC}$.

Figure 5:
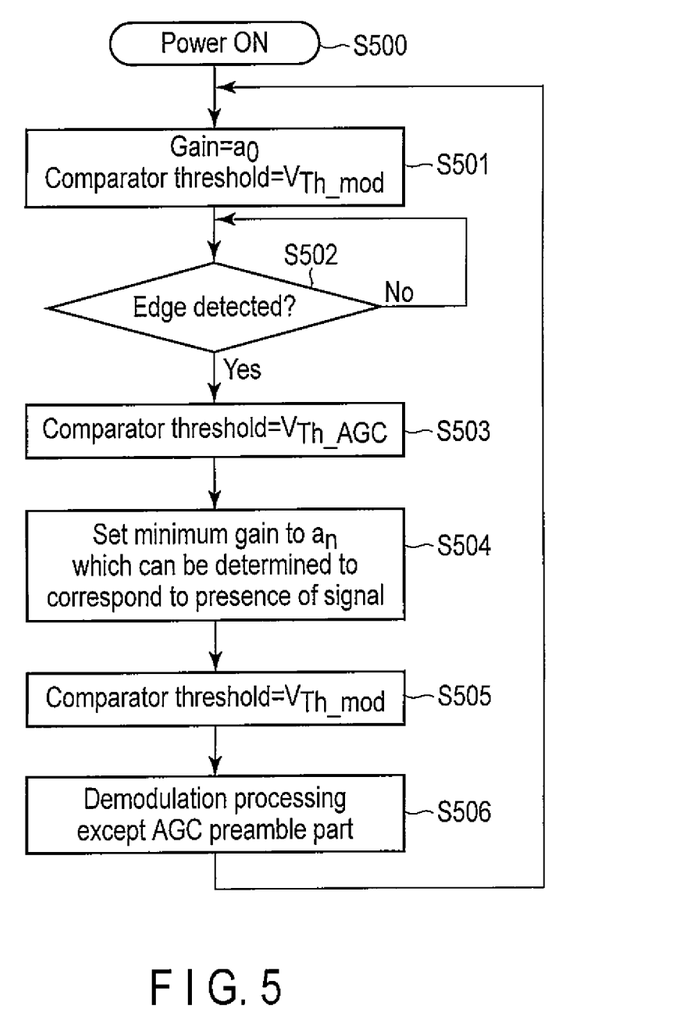
FIG. 5 is a flowchart showing an example of operation of the receiving apparatus in FIG. 4.

FIG. 5 schematically shows an example of operation of the receiving apparatus 400. In step S500 in FIG. 5, a power supply of the receiving apparatus 400 is turned on. In step S501, the gain G of the variable gain amplifier 103 is set to a maximum value $a_0$, and a comparator threshold level V is set to $V_{Th\_mod}$. In step S502, the signal processor 105 starts edge detection. Step S502 is performed until the signal processor 105 detects an edge of a frame. If the signal processor 105 detects an edge of a frame, operation then goes to step S503.

In step S503, the comparator threshold level V is set to $V_{Th\_AGC}$, and the AGC processing is started. In step S504, the signal processor 105 sets the gain G to a minimum value $a_n$ which can be determined to correspond to presence of a signal. As an example, the signal processor 105 determines presence or absence of a signal by discreetly changing the gain G within the predetermined range, and selects, as a setting value of the gain G, a minimum gain $a_n$ among gains determined to correspond to presence of a signal.

In step S505, the comparator threshold level is set to $V_{Th\_mod}$, and the AGC processing ends. After the AGC processing ends, the receiving apparatus 400 receives remaining parts of the frame, with the gain G of the variable gain amplifier 103 set to the value $a_n$ and with the comparator threshold level V set to $V_{Th\_mod}$. In step S506, the signal processor 105 performs demodulation processing on a synchronization preamble part and a data bit part which follow after the AGC preamble part.

In the present embodiment, the same method as described in the first embodiment can be used as a method of determining presence of a signal. Further, the same value as used during the AGC processing and during the demodulation processing may be used as the second threshold level for determining presence or absence of a signal.

As described above, in the receiving apparatus 400 according to the present embodiment, the comparator threshold level is set to a greater value for the AGC processing than that for the processing other than the AGC processing. Accordingly, the gain is prevented from being set to be lower than a proper value under influence of noise. As a result, a desired SNR can be obtained, and reception performance can be improved.

Fourth Embodiment

A receiving apparatus according to a fourth embodiment will be described with reference to FIGS. 4 and 6.

Figure 6:
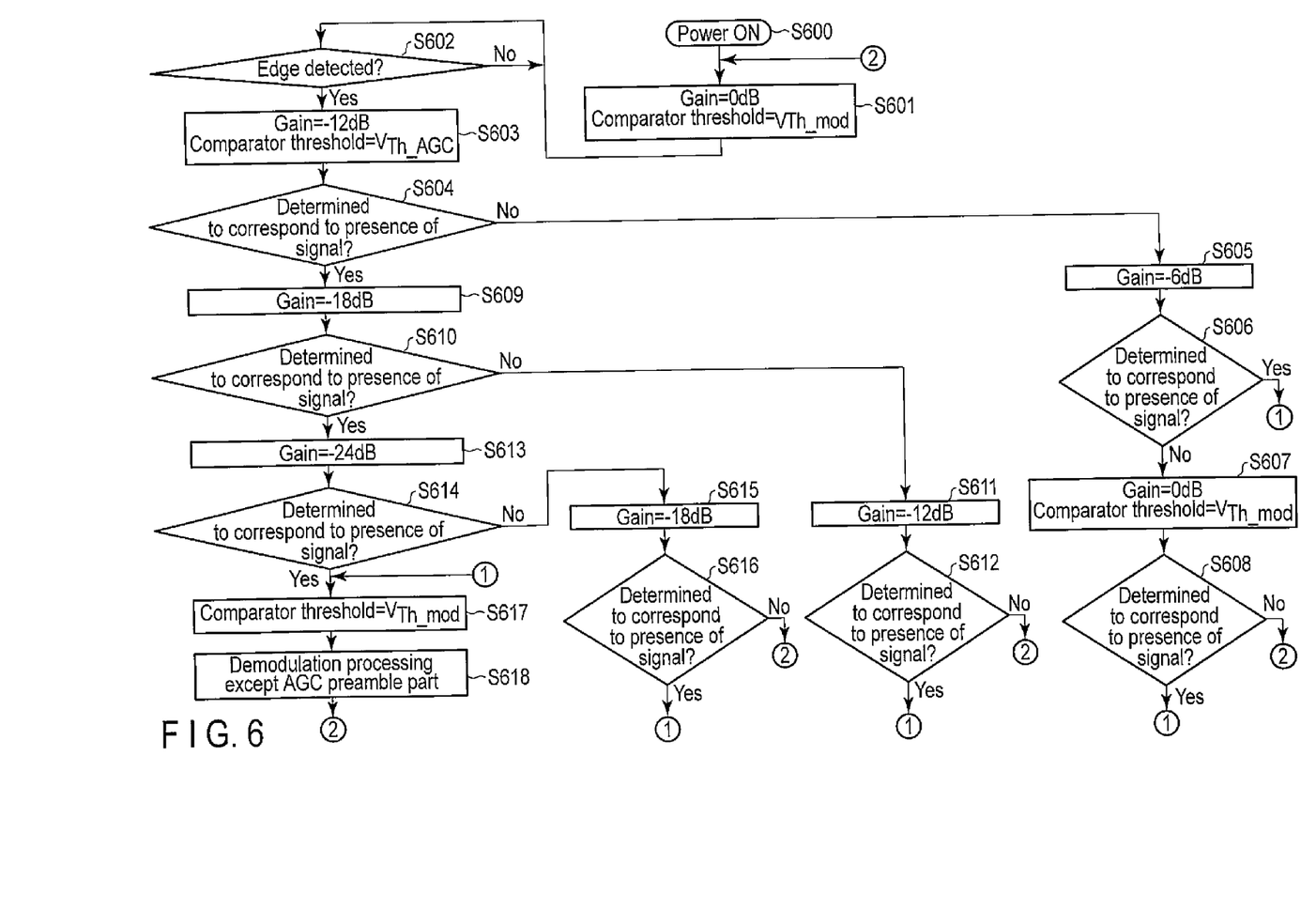
FIG. 6 is a flowchart showing operation of a receiving apparatus according to a fourth embodiment.

The receiving apparatus according to the present embodiment has the same configuration as the receiving apparatus 400 in FIG. 4, and controls the gain of the variable gain amplifier 103 in accordance with a binary search algorithm shown in FIG. 6. The present embodiment will be described with reference to an example that the gain which can be set in the variable gain amplifier 103 ranges from 0 dB to −24 dB and is set each 6 dB as a unit. The gain control method according to the present embodiment is not limited to an example of the binary search algorithm shown in FIG. 6, and the range of the gain and the unit of control can be appropriately changed.

In step S600 in FIG. 6, at first, a power supply of the receiving apparatus in the present embodiment is turned on. In step S601, the gain G of the variable gain amplifier 103 is set to 0 dB which is a maximum value, and a comparator threshold level V is set to $V_{Th\_mod}$. In step S602, the signal processor 105 starts edge detection. Step S602 is performed until the signal processor 105 detects an edge of a frame. If the signal processor 105 detects an edge of a frame, the operation then goes to step S603.

In step S603, the gain G is set to −12 dB, and the comparator threshold level V is set to $V_{Th\_AGC}$, and the AGC processing is started. $V_{Th\_AGC}$ is a value greater than $V_{th\_mod}$. In step S604, the signal processor 105 determines presence or absence of a signal. If presence of a signal is determined, the operation then goes to step S609.

In step S609, the gain G is reduced by one unit (6 dB), i.e., the gain G is set to −18 dB. In step S610, the signal processor 105 determines presence or absence of a signal. If presence of a signal is determined, the operation then goes to step S613.

In step S613, the gain G is reduced by one unit, i.e., the gain G is set to −24 dB which is a minimum value. In step S614, the signal processor 105 determines presence or absence of a signal. If presence of a signal is determined even when the gain G is set to the minimum value of −24 dB, the signal processor 105 determines a current gain value (−24 dB) as a setting value, and the operation goes to step S617. Step S617 and the subsequent step S618 will be described later.

On the other hand, if absence of a signal is determined in step S614, the operation goes to step S615. In step S615, the gain G is increased by one unit, i.e., the gain G is set to −18 dB. In step S616, the signal processor 105 determines presence or absence of a signal. If presence of a signal is determined in step S616, the signal processor 105 determines a current gain value (−18 dB) as a setting value because the presence of a signal is determined again with use of the gain which was used when the presence of a signal was determined in step S610. Then, the operation goes to step S617.

If absence of a signal is determined in step S616, i.e., if absence of a signal is determined regardless of using the value of the gain which was used when the presence of a signal was determined in step S610, the signal processor 105 determines a false detection, and the operation returns to step S601.

If absence of a signal is determined in step S610, the operation goes to step S611. In step S611, the gain G is increased by one unit, i.e., the gain G is set to −12 dB. In step S612, the signal processor 105 determines presence or absence of a signal. If presence of a signal is determined in step S612, the signal processor 105 determines a current gain value (−12 dB) as a setting value because the presence of a signal is determined again with use of the gain which was used when the presence of a signal was determined in step S604. Then, the operation goes to step S617.

If absence of a signal is determined in step S612, i.e., if absence of a signal is determined regardless of using the gain which was used when the presence of a signal was determined in step S604, the signal processor 105 determines a false detection and the operation returns to step S601.

Further, if absence of a signal is determined in step S604, the operation then goes to step S605. In step S605, the gain G is increased by one unit, i.e., the gain G is set to −6 dB. In step S606, the signal processor 105 determines presence or absence of a signal. If presence of a signal is determined, the signal processor 105 determines a current value of the gain (−6 dB) as a setting value and the operation goes to step S617.

If absence of a signal is determined in step S606, the operation then goes to step S607, the gain G is set to 0 dB which is the maximum value, and the comparator threshold level is set to $V_{Th\_mod}$. In step S608, the signal processor 105 determines presence or absence of a signal. If absence of a signal is determined in step S608, the signal processor 105 determines a false detection and transits to a standby mode. Then, the operation returns to step S601. Otherwise, if presence of a signal is determined in step S608, the signal processor 105 determines a current value of the gain (0 dB) as a setting value and the operation goes to step S617.

In step S617, the comparator threshold level V is set to $V_{Th\_mod}$, and the AGC processing ends. In step S618, the signal processor 105 demodulates the synchronization preamble part and data bit part except the AGC preamble part. Upon completion of a series of demodulation processing for a received frame, the operation returns to step S601. The signal processor 105 sets the gain G to 0 dB which is the maximum value and performs the edge detection again.

The signal processor 105 according to the present embodiment detects a minimum value of the gain which can be determined to correspond to presence of a signal, in accordance with the binary search algorithm in FIG. 6 for the AGC period, and determines the minimum value as a setting value of the gain. As shown in step S607, if the gain is set to 0 dB, which is a maximum value, during the AGC processing, the comparator threshold level V is set to $V_{Th\_mod}$. This prevents receiver sensitivity from deterioration associated with the increase of the comparator threshold level V from $V_{Th\_mod}$ to $V_{Th\_AGC}$. Specifically, when the gain is set to the maximum value during the AGC processing, the gain of the variable gain amplifier 103 can be controlled to obtain a desired SNR without deteriorating the receiver sensitivity, by setting the comparator threshold level V to $V_{Th\_mod}$.

As described above, the receiving apparatus according to the present embodiment achieves the same effects as the third embodiment. In addition, receiver sensitivity is prevented from deterioration by setting the comparator threshold level V to be lower when the gain of the variable gain amplifier is set to the maximum value for the AGC period.

Fifth Embodiment

A receiving apparatus according to a fifth embodiment will be described with reference to FIGS. 4 and 7.

Figure 7:
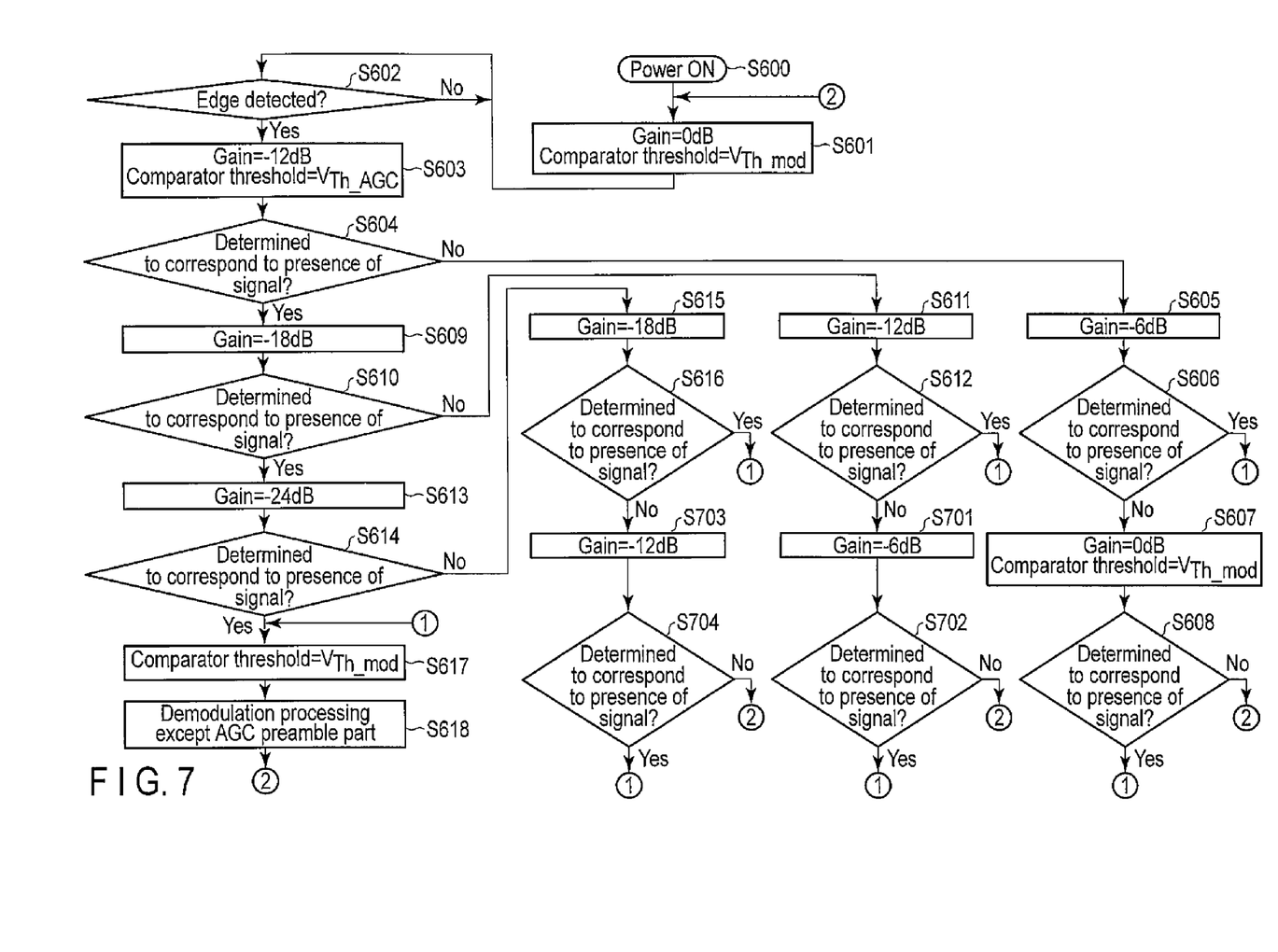
FIG. 7 is a flowchart showing operation of a receiving apparatus according to the fifth embodiment.

The receiving apparatus according to the present embodiment has the same configuration as the receiving apparatus 400 in FIG. 4, and controls a gain of a variable gain amplifier 103 in accordance with a binary search algorithm shown in FIG. 7. The present embodiment will be described with reference to an example that the gain which can be set in the variable gain amplifier 103 ranges from 0 dB to −24 dB, and is set each 6 dB as a unit. A gain control method according to the present embodiment is not limited to the example of the binary search algorithm shown in FIG. 5 and the range of the gain and the unit of control can be appropriately changed.

In FIG. 7, the same parts as those in FIG. 6 are respectively denoted at the same reference numbers as shown in FIG. 6. Descriptions of those parts will be omitted, and descriptions will be mainly made of different parts from FIG. 6.

When presence or absence of a signal is determined by using a value of a gain which is once determined to correspond to presence of a signal, as in steps S612 or S616 in FIG. 7, presence of a signal is assumed to be determined if the value is used again in one same AGC period. However, absence of a signal may be determined in some cases since a comparator threshold level is substantially equal to a received power after amplification by the variable gain amplifier 103. In such cases, the present embodiment determines presence or absence of a signal by increasing the gain by one unit in order to determine whether the absence of a signal is determined by redetermination, because of substantial equality between the comparator threshold level and the received power after amplification by the variable gain amplifier 103 or because of a false detection in a previous determination. If presence of a signal is determined after increasing the gain by one unit, the signal processor 105 determines the value of the gain after increase, as a setting value. The signal processor 105 determines a value of the gain before the increase, to cause a result in that a received power after amplification by the variable gain amplifier 103 exceeds, at a high probability, the comparator threshold level. If absence of a signal is determined after increase of the gain, the signal processor 105 determines a false detection.

In step S612 in FIG. 7, the signal processor 105 redetermines presence or absence of a signal by using a gain value (−12 dB) which is once determined to correspond to presence of a signal in step S610. If absence of a signal is determined in step S612, operation goes to step S701 in which a gain G is increased by one unit, i.e., the gain G is set to −6 dB. In step S702, the signal processor 105 determines presence or absence of a signal. If presence of a signal is determined, the signal processor 105 determines a current value of the gain (−6 dB) as a setting value, and goes to step S617. If absence of a signal is determined, the signal processor 105 returns to step S601.

In step S616 in FIG. 7, the signal processor 105 redetermines presence or absence of a signal by using a value of the gain (−18 dB) which is once determined to correspond to absence of a signal in step S610. If absence of a signal is determined in step S616, the operation goes to step S703, and the gain G is increased by one unit, i.e., the gain G is set to −12 dB. In step S704, the signal processor 105 determines presence or absence of a signal. If presence of a signal is determined, the signal processor 105 determines a current value (−12 dB) of the gain as a setting value, and goes to step S617. Otherwise, if absence of a signal is determined, the signal processor 105 returns to step S601.

As has been described above, the receiving apparatus according to the present embodiment achieves the same effects as the fourth embodiment. In addition, presence or absence of a signal is redetermined with a gain which has once been confirmed to correspond to presence of a signal during the AGC processing. If absence of a signal is determined as a redetermination result, a value of the gain by which a desired SNR can be obtained can be determined by determining presence or absence of a signal with the gain more increased. Accordingly, it is possible to reduce a probability of failing in demodulation since a received power after amplification by the variable gain amplifier 103 decreases to be smaller than a comparator threshold level due to a low gain.

Sixth Embodiment

A receiving apparatus according to a sixth embodiment will be described. According to the fifth embodiment, if presence of a signal is redetermined with a gain which is once determined to correspond to presence of a signal and if absence of a signal is determined as a result of the redetermination, presence or absence of a signal is determined with the gain increased by one unit. In contrast, in the sixth embodiment, if presence or absence of a signal is redetermined with a gain which is once determined to correspond to presence of a signal and if presence of a signal is then determined, a value obtained by further increasing the gain by another one unit is used as a setting value. Specifically, if presence of a signal is determined in step S612 or S616 in FIG. 6, operation goes to step S617 through a step of increasing the value of the gain by one unit. A higher SNR can be obtained by thus further increasing a gain which has twice been determined to correspond to presence of a signal.

According to at least one of the embodiments described above, a gain is avoided from being set to be low under influence of noise, by setting a stricter condition on which presence of a signal is determined in the AGC processing than a condition on which presence of a signal is determined in the demodulation processing on a data bit part. Accordingly, reception performance can be improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A receiving apparatus comprising:
 a variable gain amplifier configured to amplify a first received signal by a variable gain to generate a second received signal;
 a comparator configured to compare a signal level of the second received signal with a first threshold to generate a third received signal, a signal level of the third received signal being set to a high signal if the signal level of the second received signal is greater than the first threshold, the signal level of the third received signal being set to a low signal if the signal level of the second received signal is not greater than the first threshold; and
 a signal processor configured to determine presence of a signal if a rate of high signals in third received signals for a period is greater than a second threshold, and perform a control of the gain and a demodulation processing based on a determination result,
 wherein the signal processor is configured to set a first value as the second threshold for a first period in which the control of the gain is performed and to set a second value as the second threshold for a second period in which the demodulation processing is performed, and the first value is greater than the second value.

2. The apparatus according to claim 1, wherein the signal processor samples the third received signals to generate a plurality of samples, and determines presence of a signal if a rate of high signals in the samples is greater than the second threshold.

3. The apparatus according to claim 1, wherein the signal processor redetermines, for the first period, presence or absence of a signal with the gain which is once determined to correspond to presence of a signal,
 if absence of a signal is determined as a redetermination result, the signal processor further determines presence or absence of a signal by increasing the gain by a predetermined value, and
 if presence of a signal is determined after the increasing of the gain, the signal processor determines, as a value of the gain for the second period, the gain obtained by further increasing the gain by the predetermined value, or if absence of a signal is determined after the increasing of the gain, the signal processor determines a detection error and transits to a standby mode.

4. The apparatus according to claim 1, wherein the signal processor redetermines, for the first period, presence or absence of a signal with the gain which is once determined to correspond to presence of a signal, and
 if presence of a signal is determined as a redetermination result, the signal processor determines, as a value of the gain for the second period, a value obtained by increasing the gain which is redetermined to correspond to presence of a signal, by a predetermined value.

* * * * *